G. E. CASSEL.
COMBINED DRIVING AND STEERING DEVICE FOR MOTOR VEHICLES.
APPLICATION FILED NOV. 12, 1917.
1,296,163.
Patented Mar. 4, 1919.
4 SHEETS—SHEET 1.
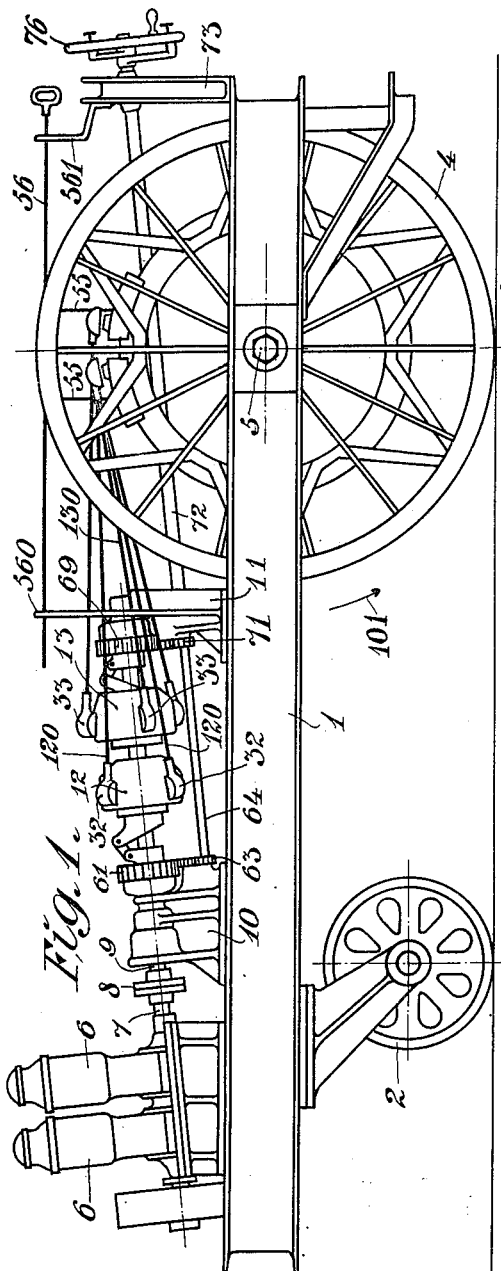
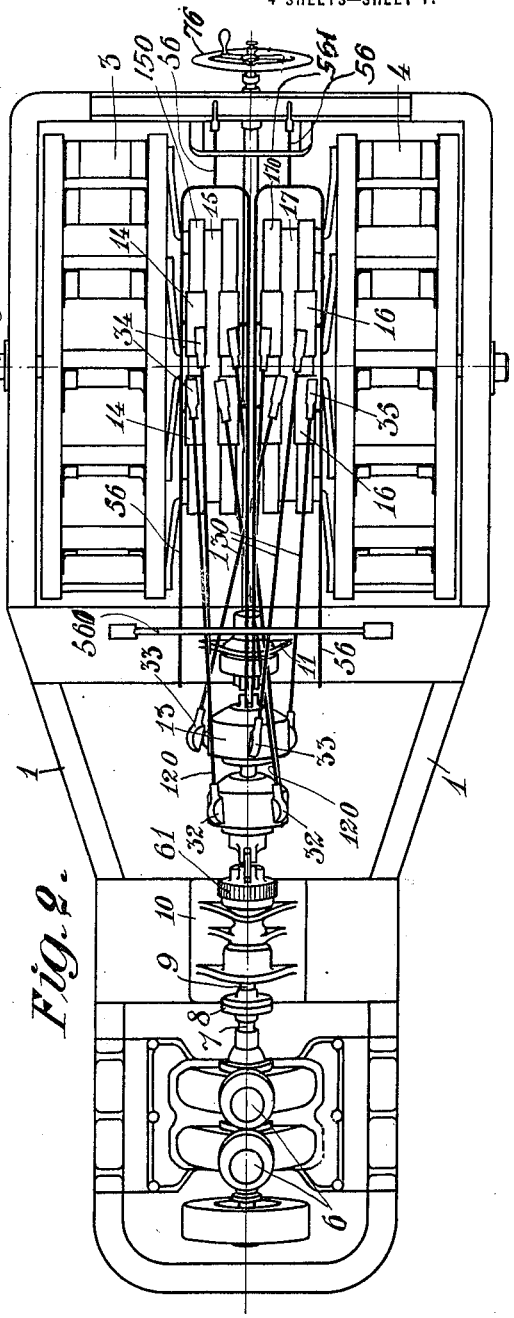
Inventor.
Gunnar Elias Cassel,
By
Atty.

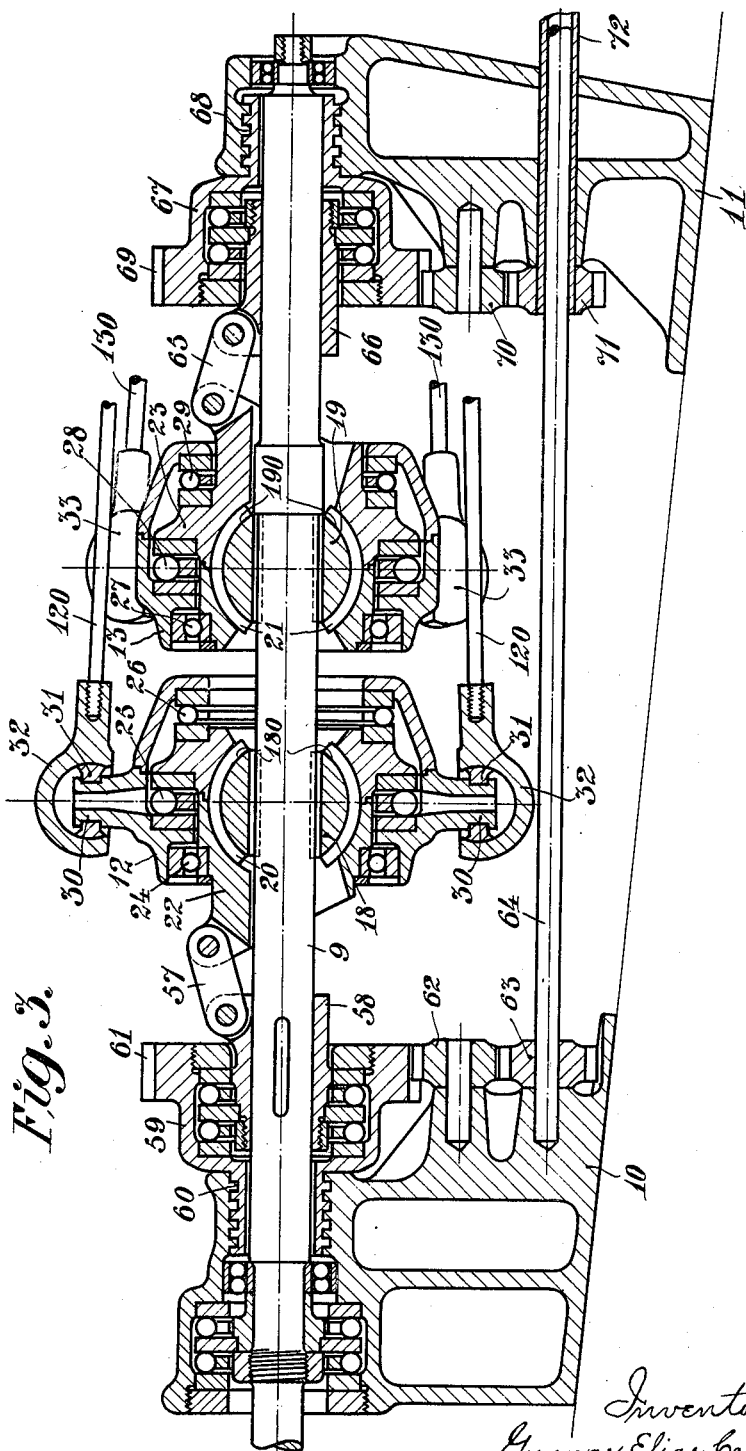

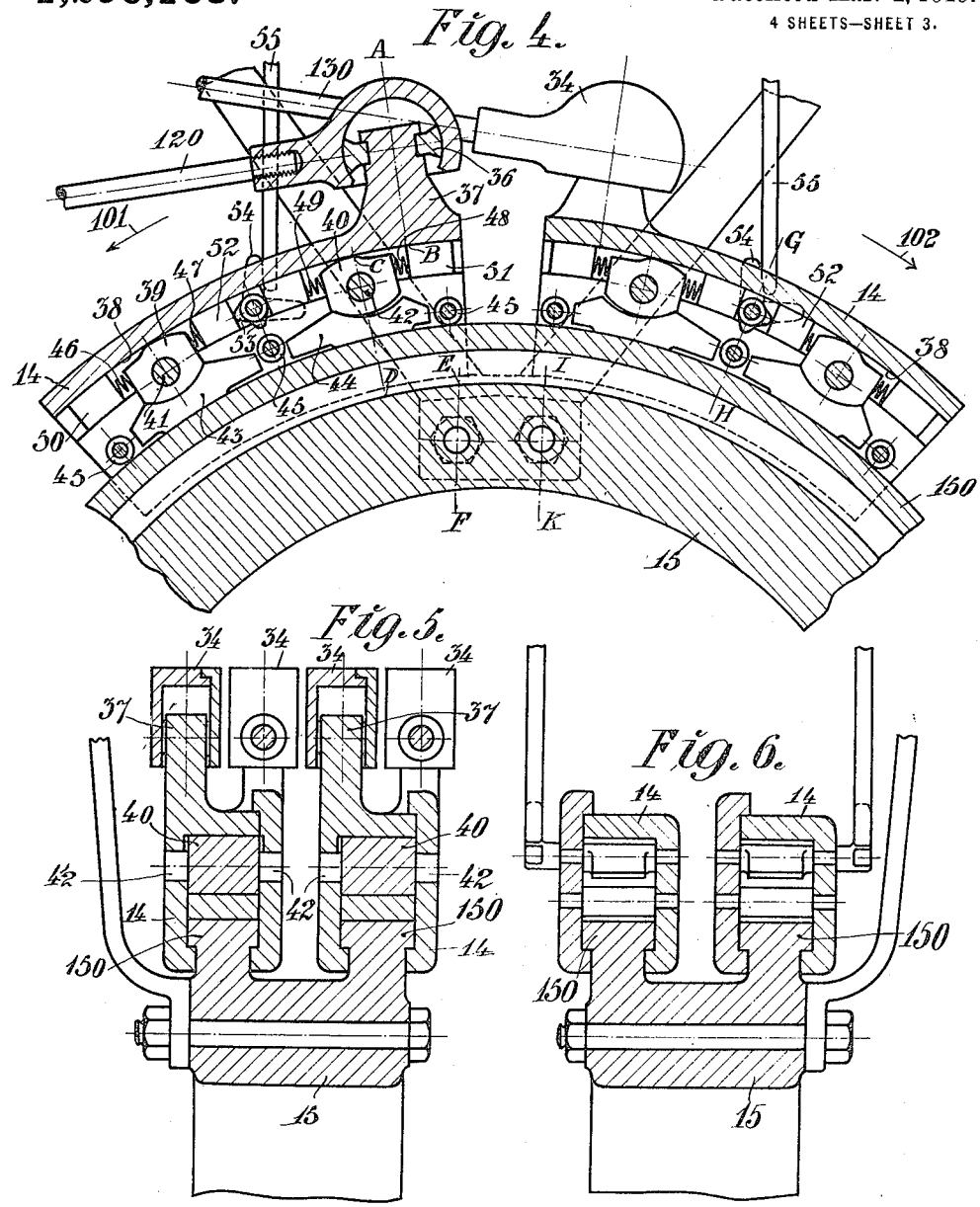

G. E. CASSEL.
COMBINED DRIVING AND STEERING DEVICE FOR MOTOR VEHICLES.
APPLICATION FILED NOV. 12, 1917.
1,296,163.
Patented Mar. 4, 1919.
4 SHEETS—SHEET 4.
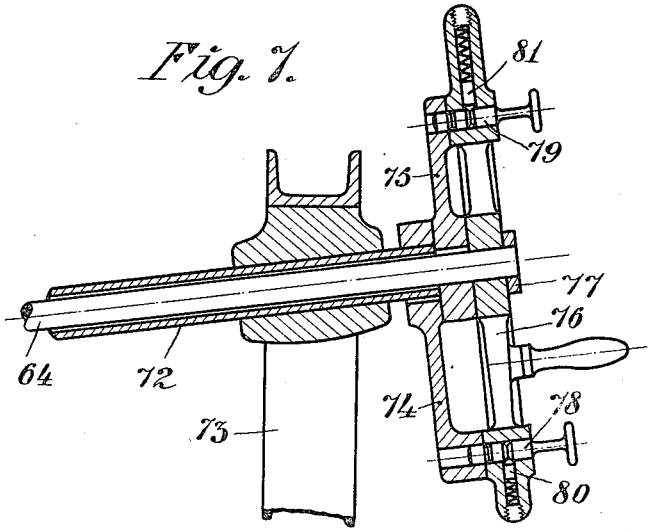
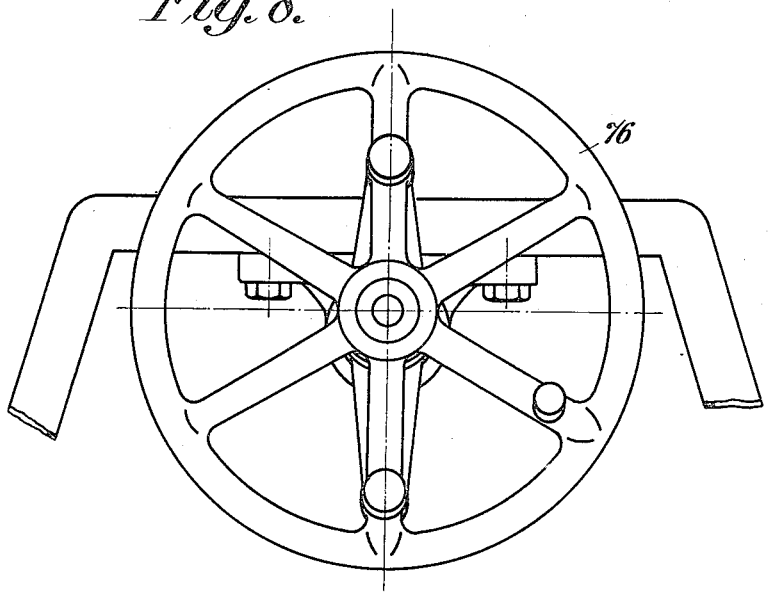

UNITED STATES PATENT OFFICE.

GUNNAR ELIAS CASSEL, OF STOCKHOLM, SWEDEN, ASSIGNOR TO ARTUR LORENZ OLOF ABRAHAM LEFFLER, OF DJURSHOLM, SWEDEN.

COMBINED DRIVING AND STEERING DEVICE FOR MOTOR-VEHICLES.

1,296,163. Specification of Letters Patent. Patented Mar. 4, 1919.

Application filed November 12, 1917. Serial No. 201,621.

*To all whom it may concern:*

Be it known that I, GUNNAR ELIAS CASSEL, a citizen of the Kingdom of Sweden, residing at Stockholm, Sweden, have invented a new and useful Improved Combined Driving and Steering Device for Motor-Vehicles, of which the following is a specification.

This invention relates to an improved combined driving and steering device for motor vehicles, and particularly for heavy, slowly running vehicles, such as traction engines for agricultural purposes, motor rolls, automobiles for carrying guns and for other purposes.

One object of the invention is to provide a combined driving and steering device for such vehicles by means of which the velocity of the vehicle may be changed within wide limits, and the steering may be effected in an effective and easy manner.

Another object of the invention is to obtain a high efficiency of the power transmission between the shaft of the engine and the driving wheels of the vehicle, so that almost the whole effect of said engine will be positively utilized to drive the vehicle.

The problem of constructing a traction engine for agricultural purposes is very difficult, particularly due to the loss of a power-transmission device by means of which the generally great speed of the engine can be reduced with a small loss of power to the very low velocity with which the driving wheels of such a vehicle should be rotated.

The invention is based upon the use of a power transmission device of the kind set forth in my pending application Serial No. 121,984, filed September 25, 1916.

The invention consists, chiefly in the provision in connection with each of the driving wheels of a separate, independently working power-transmission device of the said kind, in order that the driving wheels may be driven with the same velocity or with different velocities, independently of each other, thereby enabling the vehicle to move straight-away or to be steered in one direction or the other.

The invention is illustrated in the accompanying drawings and hereinafter more fully described.

In the drawings:

Figure 1 is a side elevation of a traction engine constructed in accordance with my invention. Fig. 2 is a plan view of the engine. Fig. 3 is a vertical longitudinal section through part of the power-transmission device. Fig. 4 is a vertical longitudinal section through another portion of the power-transmission device. Fig. 5 is a detail section taken on line A—B—C—D—E—F of Fig. 4. Fig. 6 is a detail section taken on line G—H—I—K of Fig. 4. Fig. 7 is a longitudinal section through the control wheel. Fig. 8 is a side view thereof.

As shown in the drawings, Figs. 1 and 2, the traction engine to which the invention is applied, involves a frame 1 supported by one forward wheel 2 of rather small dimensions and two larger wheels 3 and 4 forming the driving wheels of the traction engine. On the frame 1 near to the forward end thereof is mounted an internal combustion engine 6 having a shaft 7 which by means of a coupling 8 is connected to a shaft 9 journaled in bearing pedestals 10 and 11 on the frame-work 1. The shaft 9 is connected by means of two power-transmission devices of the kind set forth in my pending application No. 121,984 above referred to, to the driving wheels 3 and 4 in such a way that the latter can be driven independently of each other. Each of said power-transmission devices consists of a thrust-disk 12, 13, respectively, which is adapted to perform a peculiar wabbling action during the rotation of the shaft 9. The disk 12 is connected by four links 120 with four annular segments 14 slidably mounted on the periphery of a disk 15 rigidly connected with the wheel 3 and having each a number of clutch members for operating said disk when the said segments move in the one direction or the other under the action of the wabbling disk 12. The disk 13 is similarly connected, by means of four links 130, with four annular segments 16 mounted on a disk 17 rigidly connected with the wheel 4, said annular segments 16 being, likewise, provided with clutch members for operating the disk 17. In order to obtain a variation of the ratio of gearing of the two power-transmission devices a control hand-wheel 76 is provided at the rear end of the frame 1. Slidably mounted in pedestals 560, 561 on the frame 1 are two forks 56 by means of which the rotation of the wheels 3 and 4 may be reversed, as will hereinafter be more fully described.

The devices above referred to for the transmission of power from the shaft 9 to the two wheels 3 and 4 are shown in detail in Figs. 3–6. Keyed to the shaft 9 are two members, 18, 19, and each of these members is formed with two bearing surfaces 180, 190 forming part of cylinders the axes of which are at right angles to the axis of the driving shaft 9. Said members 18, 19 engage by means of cylindric flanges 20, 21 projecting from said bearing surfaces, corresponding grooves formed in disks 22, 23, journaled on said bearing surfaces 180 and 190 respectively. Thus, said flanges 20 and 21 will cause the disks 22 and 23 to rotate with the shaft 9 while at the same time permitting them to be adjusted at different oblique angles with respect to the driving shaft. In order to permit the mounting of the disks 22 and 23 the latter, preferably, consist of several pieces. An outer disk 12 or 13, which is preferably also made of several pieces is loosely mounted on each of the disks 22 and 23 respectively by means of ball bearings 24, 25, 26 and 27, 28, 29 respectively, said ball bearings being so arranged as to cause the disks 12 and 13 to wabble under the action of the disks 22 and 23, respectively.

Each of the disks 12 and 13 is provided with four radially extending projections 30 equally distributed about the periphery of the disks, two projections of the disk 12 only being shown in the drawings, Fig. 3. Each projection 30 carries a journal ring 31 on the outer cylindrical or spherical surface of which is mounted a cup or socket 32, 33 respectively, the parts 30, 31, 32 and 30, 31, 33 forming a universal joint. The four cups 32 are rigidly connected by rods 120 (see Figs. 1 and 2) to corresponding cups 34 of similar universal joints 34, 36 mounted on projections 37 of the annular segments 14 (see Figs. 2 and 4). The cups 33 of the disk 13 are in the same way by means of rods 130 connected to the cups 35 of universal joints mounted on projections of the annular segments 16 (Fig. 2).

The disk 15 is formed with two cylindrical flanges 150, and the disk 17 is provided with two similar flanges 170. Slidably mounted on each of said flanges 150 and 170 are two annular segments 14 and 16 respectively.

The construction of the annular segments will appear from Figs. 4 and 6 in which two segments 14 are shown in longitudinal and transverse section respectively. Since the segments 14 and 16 are all alike it is sufficient to describe one segment 14 only. The segment is U-shaped in cross-section the ends of the side-walls being hook-shaped and in engagement with the flange 150, as is shown in Figs. 5 and 6. The segment is formed with a contact surface 38 concentric to the periphery of the flange 150 and situated at a certain distance therefrom. In the space within the segment are disposed two clutch members 39 and 40 which are journaled by means of pins 41 and 42 in the side-walls of the segment. In the embodiment shown, the clutch members are formed as friction pawls having curved contact surfaces. One of said contact surfaces engages the surface 38 of the annular segment, while the other contact surface of the friction pawl engages a curved recess of a shoe 43 or 44 loosely mounted on the periphery of the flange 150. In order to facilitate the movement of the friction pawls into and out of action the said shoes are permitted to move slightly with respect to the annular segments between stoppers 45. The radius of curvature of the said recesses of the shoes 43, 44 is somewhat greater than that of the contact surface of the friction pawls coöperating therewith so that the friction pawls can perform a partial rolling movement upon the shoes. As the contact surfaces coöperating with the convex surfaces of the friction pawls are both concave, large contact surfaces will be obtained between the friction pawls and the parts coöperating therewith thereby enabling large amounts of power to be transmitted through the friction pawls without the danger of permanent deformations or fractures of the pawls, nor of the members coöperating therewith.

The two friction pawls 39, 40 mounted in each annular segment are disposed oppositely, each of them operating for one direction of revolution. To this end the pawls are mounted to turn upon their journal pins into a position in which they will lie loosely between the surface 38 and the corresponding shoes 43 or 44.

In order to bring the friction pawls into or out of operative position the following device is used. At opposite sides with respect to the journal pins 41 and 42 the pawls 39, 40 are engaged by springs 46, 47 and 48, 49 respectively. The two outer springs 46 and 48 also engage fixed members 50, 51 of the annular segment and are normally under tension so that there is a tendency for said springs to hold the pawls out of operative position. The inner springs 47 and 49 which are adapted to bring the friction pawls into operative position are made stronger than the springs 46 and 48 and are so disposed between the corresponding friction pawls and a block 52 slidably mounted in the annular segment that the springs will be stretched or compressed according as the said block is moved in one direction or the other. The operation of the block 52 is effected by means of a cam disk 53 mounted in an aperture in the block and provided with two cams which are set at an angle of 90° in relation to each other. The shaft of the cam disk 53 extends through one side wall of the annular segment and carries outside thereof two lateral projections 54 set at an angle of 90° in relation to each other which projections may be operated by means of an arm 55 extending downwardly from one of the forks 56 above referred to.

To adjust the disk 12 above referred to and set the same to run in different operative positions independently of the disk 13, a hub 58 is keyed to slide on, but to rotate with the driving shaft 9, and this hub is, as shown in Fig. 3, connected to the member 22 by means of a link 57. Mounted on the said hub by means of thrust ball bearings is a casing 59, this mounting being such that said casing is caused to move longitudinally with the hub 58, while permitting the latter to revolve freely with the shaft 9. Said casing 59 is formed with a screw-threaded projection 60, the screw-threads of which engage corresponding screw-threads cut in the pedestal 10. Said casing 59 is also provided on its outer periphery with teeth 61 meshing with a pinion 62, which in turn meshes with another pinion 63 secured to the control shaft 64. In the same manner as above described in connection with the disk 12, the adjustable thrust-disk 23 of the disk 13 is connected to another controlling shaft. To this end the said disk 23 is connected by a link 65 to a hub 66, mounted to slide on, but to rotate with the driving shaft 9 said hub supporting by means of thrust ball bearings a casing 67 adapted to move longitudinally with, but not to rotate with the hub 66, said casing 67 being likewise provided with a screw-threaded axially extending projection 68 engaging screw-threads formed in the bearing pedestal 11 and having also teeth 69 meshing with a pinion 70 which in turn meshes with another pinion 71 secured to a controlling shaft 72. Said controlling shaft 72 is formed as a sleeve surrounding the shaft 64, so as to freely revolve thereon. The shaft 72 is mounted partly in the pedestal 11, partly in a pedestal 73 attached to the frame 1 at the rear end thereof.

Attached to the outer end of the hollow shaft 72 is an arm 74, another arm 75 being keyed to the end of the shaft 64 extending beyond the end of the hollow shaft 72. Loosely mounted on the said end of the shaft 64 is a hand-wheel 76, which is fixed against endwise movement by means of a sleeve 77. The hand-wheel 76 may be coupled to one arm 74, 75 or the other by means of coupling pins 78, 79 according as one shaft 64, 72 or the other is to be turned. The coupling pins 78, 79 are provided with spring-operated locking pins 80, 81 by means of which the pins 78, 79 may be secured in operative position or in a position in which they do not connect the hand-wheel with the arms 74 or 75.

The device described above operates as follows:

In the position, shown in Fig. 3, in which the disks 22, 23 are set at right angles to the axis of the driving shaft 9, said disks 22, 23 will revolve freely within the disks 12, 13 without imparting any motion whatever to the same.

When it is desired to move the traction engine forward the friction pawls operating for said direction of movement, viz, the friction pawls 39, are set into operative position, which is effected by so displacing the forks 56 that the arms 55 thereof will act upon one of the lateral projections 54 of the shaft of the cam disks 53 to throw the same into the position shown in Fig. 4 in which the springs 47 are under compression and the springs 49 are released. The springs 47 will thus throw the friction pawls 39 into operative engagement with the surface 38 and the corresponding shoes 43 while the friction pawls 40 are held in their inoperative position under the action of the springs 48.

Assuming the traction engine is to be driven straight-away in the forward direction of travel, the shafts 64 and 72 are rotated together by means of the hand-wheel 76 in such a direction that the casings 59 and 67 operated by means of the gears 63, 62, 61 and 71, 70, 69, respectively, from said shafts will move toward the disks 22 and 23 respectively. With said casings 59 and 67 also the parts contained therein are moved axially toward said disks. Due to the link connections 57 and 65 the disks 22 and 23 will be caused to turn on the bearing members 18 and 19 and be set at an angle to the axis of the driving shaft 9. As the shafts 64 and 72 are both connected with the hand-wheel the obliquity of the disk 22 will be equal to that of the disk 23. It is obvious that when the disks 22 and 23 are thus set at an oblique angle to the axis of the driving shaft 9, the rotation thereof with said driving shaft will cause the outer disks 12 and 13 which are prevented from rotation on account of their connection with the annular segments of the driving wheels, to vibrate back and forth with a peculiar wabbling action in which one peripheral point after the other of said disks 12 and 13 will be successively thrown to an extreme position in the longitudinal direction of the driving shaft. The connecting rods 120 and 130 will thus be so reciprocated that each rod 130 commences its movement a quarter of a period of movement earlier or later than the two adjacent rods. By means of the rods 120 the annular segments 14 are caused to oscillate upon the flanges 150 of the disk 15, the movement of each separate annular segment likewise preceding or succeeding a quarter of a period of movement in relation to the movement of the adjacent segments. By means of the rods 130 a similar motion will be transmitted to the annular segments 16.

During the movement of the annular segments in the direction indicated by the arrow 101 (Fig. 4), the disks 15 and 17 will be moved instantly, as the friction pawls 39 already clamped between the surface 38 and the shoes 43 under the action of the springs 47, will be more strongly jammed therebetween because of the rolling movement. Thus, the shoes 43 are so pressed against the flanges 150 and 170 as to cause the disks 15 and 17 to move with the annular segments in the direction indicated by the arrow 101. When the annular segments are moved in the opposite direction, as indicated by the arrow 102 (Fig. 4) the friction pawls will turn on their journal pins into a position in which they will lie loosely between the surface 38 and the shoes 43, thereby permitting the latter to slide freely on the flanges 150 and 170 without imparting any motion whatever to the disks 15 and 17. As the annular segments disposed on each of the disks 15 and 17 will positively operate the disks in succession, a continuous and even rotating motion will be imparted to the disks 15 and 16 and, consequently, to the wheels 3 and 4. As the annular segments of the two wheels move with the same speed the wheels will also revolve with the same velocity, thereby causing the traction engine to move straight-away.

The speed of travel of the vehicle may be varied within wide limits by simultaneously changing the angle of obliquity of the disks 22 and 23 with relation to the axis of the driving shaft 9. If there is a tendency for the vehicle to turn to one side or the other, due for instance, to the oblique attachment of an agricultural implement to the vehicle, the latter may be caused to move straight-away by adjusting one of the disks 22 or 23 to an angle of obliquity different from that of the other disk, thereby causing the wheels 3 and 4 to rotate with different speeds. Similarly the steering in curves is effected, the one shaft 64, 72 or the other being then turned to the desired degree by means of the hand-wheel 76.

When it is desired to drive the vehicle backward the forks 56 are displaced to turn the cam disks 53 about 90° thereby causing the sliding block 52 to compress the springs 49 and to release the springs 47, so that the pawls 39 will be released and the pawls 40 will be thrown into operative position. The disks 15, 17 will now be rotated in the direction of the arrow 102 (Fig. 4) inasmuch as the friction pawls 40 and the corresponding shoes 44 will by rolling be firmly jammed between the surface 38 of the annular segments and the flanges 150, 170, whereas in the movement of the segments in the opposite direction they will move freely with relation to said flanges without imparting any motion whatever to the disks 15 and 17.

It is evident, from the above description, that the two driving wheels 3 and 4 can be operated independently of each other, the power-transmission device for each of said wheels being entirely independent of that of the other wheel. Thus the steering of the engine will be effected readily and easily, this being accomplished by the same means used for varying the speed of travel of the vehicle. Of course, a separate hand-wheel may, if desired, be provided for each of the shafts 64 and 72 without departing from the scope or principle of the invention. It will also be understood that the clutch mechanism used in connection with the wheels 3 and 4 may take various forms.

What I claim, and desire to secure by Letters Patent is:

1. In a combined driving and steering device for power driven vehicles, the combination with the driving wheels of the vehicle, a separate clutch mechanism for each wheel, and a single driving shaft, of separate operating means for each mechanism driven by the shaft, independent controlling means for each operating means movable longitudinally of the shaft, and means to independently actuate the controlling means.

2. In a combined driving and steering device for power driven vehicles, the combination with the driving wheels of the vehicle, a separate clutch mechanism for each wheel, and a single driving shaft, of separate operating means for each mechanism driven by the shaft, independent controlling means for each operating means movable longitudinally of the shaft, means to independently actuate the controlling means, and means to simultaneously operate the latter.

3. In a combined driving and steering device for power driven vehicles, the combination with the driving wheels of the vehicles, a separate clutch mechanism for each wheel, and a single driving shaft, of separate operating means for each mechanism driven by the shaft, independent controlling means for each operating means, mounted on and rotatable with the shaft, means to move each controlling means longitudinally of the shaft independently, and means to simultaneously operate the controlling means.

4. In a combined driving and steering device for power driven vehicles the combination with each of the driving wheels of the vehicle, of a separate clutch mechanism, a driving shaft, obliquely acting thrust-disks mounted on said shaft for rotation therewith, other thrust-disks loosely mounted on said first-mentioned disks, means for connecting said loosely mounted disks with said clutch mechanisms, a single control wheel connected with means for adjusting said first-mentioned disks at different oblique angles with respect to the driving shaft.

In testimony whereof I affix my signature.

GUNNAR ELIAS CASSEL.